(12) United States Patent
Pyo (10) Patent No.: US 11,891,575 B2
(45) Date of Patent: Feb. 6, 2024

(54) WASTE SEPARATOR SCRAP OIL EXTRACTION DEVICE AND METHOD OF PRODUCING RECYCLATE USING SAME

(71) Applicant: HM CORPORATION, Yangsan-si (KR)

(72) Inventor: Sang Kil Pyo, Yangsan-si (KR)

(73) Assignee: DTR CORPORATION

( * ) Notice: Subject to any disclaimer, the term of this patent is extended or adjusted under 35 U.S.C. 154(b) by 361 days.

(21) Appl. No.: 17/458,978

(22) Filed: Aug. 27, 2021

(65) Prior Publication Data

US 2022/0220390 A1    Jul. 14, 2022

Related U.S. Application Data

(63) Continuation of application No. PCT/KR2021/001056, filed on Jan. 27, 2021.

(30) Foreign Application Priority Data

Jan. 14, 2021    (KR) .................... 10-2021-0005379

(51) Int. Cl.
*C10G 1/04*    (2006.01)
*H01M 10/0525*    (2010.01)
*H01M 10/54*    (2006.01)

(52) U.S. Cl.
CPC ........ *C10G 1/045* (2013.01); *H01M 10/0525* (2013.01); *H01M 10/54* (2013.01); *C10G 2300/1003* (2013.01)

(58) Field of Classification Search
CPC ........... C10G 1/045; C10G 2300/1003; H01M 10/0525; H01M 10/54; H01M 50/40; B09B 2101/16; B09B 2101/75; B09B 3/00; B29B 9/06; B29B 17/04; B29B 2017/0464; B30B 9/12; B30B 9/124; Y02W 30/20; Y02W 30/62; Y02W 30/84

See application file for complete search history.

(56) References Cited

U.S. PATENT DOCUMENTS

| | | | | |
|---|---|---|---|---|
| 5,366,165 A | * | 11/1994 | Jackman | B03B 9/061 241/24.19 |
| 5,375,778 A | * | 12/1994 | Lundquist | B03B 9/061 241/20 |
| 5,578,700 A | * | 11/1996 | Hunt | B29B 13/08 264/102 |

(Continued)

*Primary Examiner* — Ali Z Fadhel
(74) *Attorney, Agent, or Firm* — Park & Associates IP Law Office (57) ABSTRACT

Proposed is a waste separator scrap oil extraction device for producing a recyclate from high-density polyethylene (HDPE) scrap, the HDPE being used as a material for a separator of a lithium ion secondary battery, and to a method of producing a recyclate using the same. The waste separator scrap oil extraction device includes: a first extraction means into which pulverized scrap is input, and configured to primarily separate oil from scrap while extruding the input scrap by a pressurization method with a screw; and a secondary extraction means into which the scrap from which the oil is separated by the first extraction means is input, and configured to generate oil vapor by applying heat to the scrap when the scrap is transferred by a screw and secondarily separate remaining oil by vacuum suction of the generated oil vapor.

6 Claims, 6 Drawing Sheets

(56) References Cited

U.S. PATENT DOCUMENTS

| | | | | |
|---|---|---|---|---|
| 5,685,218 A * | 11/1997 | Kemper | ............... | B30B 9/127 |
| | | | | 426/489 |
| 5,732,618 A * | 3/1998 | Buehl | ................... | B30B 9/12 |
| | | | | 100/145 |
| 2003/0228196 A1* | 12/2003 | Satchwell | ............... | B09B 3/45 |
| | | | | 405/128.55 |
| 2013/0264264 A1* | 10/2013 | Lehoux | ............... | B30B 11/24 |
| | | | | 210/231 |
| 2014/0007783 A1* | 1/2014 | Scheeres | ........... | B29C 48/908 |
| | | | | 100/96 |
| 2020/0208476 A1* | 7/2020 | Kapila | ................ | B01D 5/006 |
| 2021/0324277 A1* | 10/2021 | Kapila | ................ | B01D 17/02 |
| 2022/0403250 A1* | 12/2022 | Batt-Rawden | ....... | B01D 17/045 |

\* cited by examiner

WASTE SEPARATOR SCRAP OIL EXTRACTION DEVICE AND METHOD OF PRODUCING RECYCLATE USING SAME

REFERENCE TO RELATED APPLICATIONS

This is a continuation of International Patent Application PCT/KR2021/001056 filed on Jan. 27, 2021, which designates the United States and claims priority of Korean Patent Application No. 10-2021-0005379 filed on Jan. 14, 2021, the entire contents of which are incorporated herein by reference.

FIELD OF THE INVENTION

The present disclosure relates to a waste separator scrap oil extraction device for producing a recyclate from high-density polyethylene (HDPE) scrap, the HDPE being used as a material for a separator of a lithium ion secondary battery, and to a method of producing a recyclate using the same.

BACKGROUND OF THE INVENTION

With the recent development of high-capacity and stability security technologies, secondary batteries, which are widely used for mobile IT devices such as mobile phones and small electronic products, are expanding their application fields to electric vehicles and energy storage systems (ESS). Along with the expanding market for secondary batteries, research and development of secondary battery recycling technology is being actively conducted.

Meanwhile, a cathode material, an anode material, an electrolyte, and a separator, which are the major components constituting a secondary battery, account for more than half of the total production cost, and the ratio of production cost is high in a sequence of the cathode material, separator, anode material, and electrolyte.

As reflected in the production cost ratio as described above, the technology for material recycling or recovery in the field of conventional secondary battery technology has been mainly focused on the recovery technology of expensive metals such as lithium or cobalt constituting the cathode material, while relatively little research and development of recycling or recovery technology for the remaining major components including the separator has been conducted.

The separator is a polymer membrane having a porous structure, and not only provides a passage for ions to migrate, but also functions as a safety device to block a circuit as pores dissolve when a large current flows.

In addition, the separator is required to have high ion permeability and low electrical resistance at an operating temperature, high insulating property with respect to cathode and anode, chemical stability with respect to an electrolyte solution, and high-density filling for high capacity.

Therefore, in order to satisfy the above required characteristics, the separator is mainly made of a polyolefin-based material such as polyethylene or polypropylene, and is manufactured by mixing paraffin oil as a plasticizer with a polyethylene resin.

However, due to scrap generated during manufacturing or paraffin oil contained in the separator recovered after use in the secondary battery, the separator thus manufactured is classified as designated waste and is required to undergo separate treatment.

Thus, in the related art, in order to extract the oil contained in the separator, there have been developed technologies for eluting oil contained in a waste separator using an extraction solvent, and separating the oil again with a centrifuge for recycling.

As an example, Korean Patent No. 10-1490814 B1, entitled "Method for separating synthetic resin and oil from exhausted separator of lithium ion secondary battery", discloses a method of recovering a waste separator generated during manufacturing of a lithium secondary battery to separate and recycle synthetic resin and oil.

Figure 1:
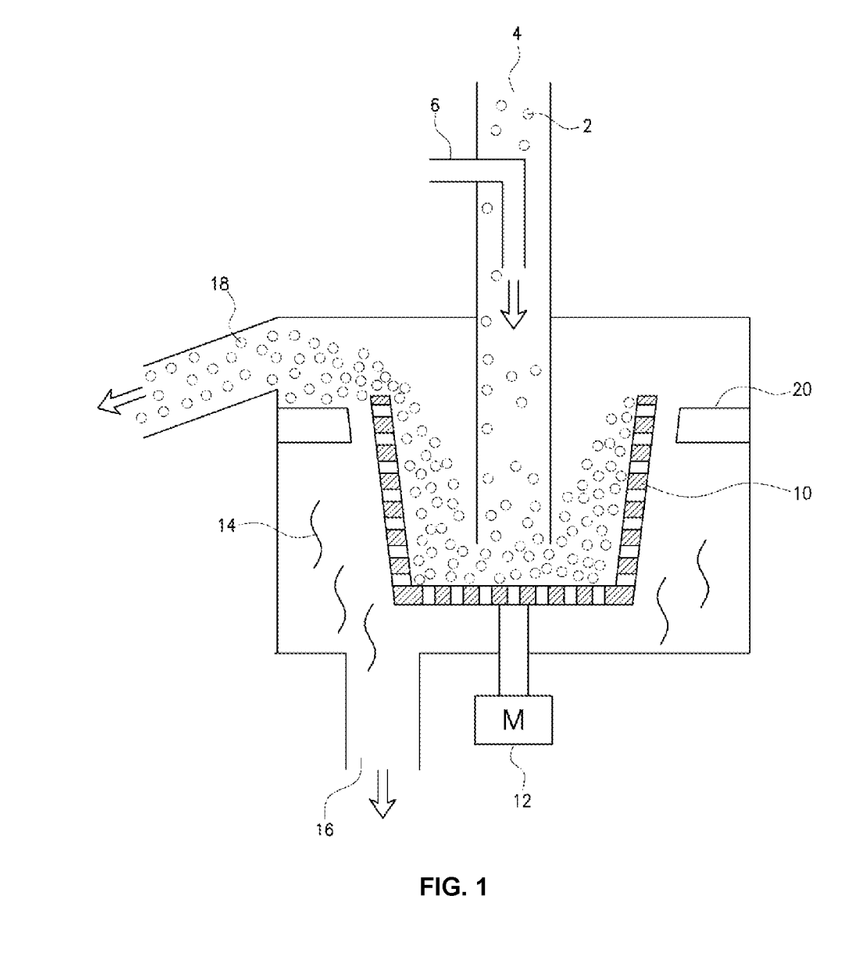
FIG. 1 is a view illustrating a centrifuge, which is a main component of a waste separator recycling treatment method according to the related art.

FIG. 1 is a view illustrating a centrifuge, which is a main component of a waste separator recycling treatment method according to the related art. The centrifuge is configured such that a pulverized separator and an oil-extraction solution mixture are introduced through an inlet 4 into a rotating screen basket 10 rotated by a motor 12.

The rotating screen basket 10 has a tapered porous mesh wall, and an overflow receiving part 20 for receiving waste resin separated from the rotating screen basket 10 is further provided on the upper outer periphery of the rotating screen basket 10.

In addition, a hot air supply port 6 is provided at the center of the inlet 4 to allow hot air drying in conjunction with centrifugal separation.

As the centrifuge having the above structure rotates, the liquid oil-extraction solvent mixture 14 is discharged to outside of the rotating screen basket 10 and then separated and discharged through an outlet 16.

The waste separator 18 from which the oil is desorbed is transferred through the overflow receiving part 20 by means of the shape of the rotating screen basket 10 and centrifugal force, and after being subjected to an additional drying process, is transferred to a separate storage space such as a silo for recycling.

Meanwhile, the related art as described above involves a process of introducing and impregnating an extraction solvent to extract the oil contained in the waste separator. In the case of such an impregnation process, a considerable amount of time and a separate stirring device are required so that the oil contained in the waste separator can be sufficiently dissolved and efficiently escaped. When the time for impregnation is not sufficiently secured, recycling failure may occur, which is problematic.

In addition, impurities remain in a screen mesh in the rotating screen basket 10 of the centrifuge after separation of the extraction solvent, which causes inconvenience in that a process of removing such residual impurities has to be further performed for effective centrifugation.

SUMMARY OF THE INVENTION

Accordingly, the present disclosure has been made keeping in mind the above problems occurring in the related art, and an objective of the present disclosure is to provide a waste separator scrap oil extraction device for separating oil contained in a waste separator using a pressurization and vacuum extraction method.

Another objective of the present disclosure is to provide a method of producing a recyclate, the method being capable of separating high-density polyethylene (HDPE) by extracting oil contained in a waste separator without the use of an extraction solvent.

In order to achieve the above objectives, according to one aspect of the present disclosure, there is provided a waste separator scrap oil extraction device including: a first extraction means into which pulverized scrap is input, and configured to primarily separate oil from scrap while extruding the input scrap by a pressurization method with a screw; and a secondary extraction means into which the scrap from which the oil is separated by the first extraction means is input, and configured to generate oil vapor by applying heat to the scrap when the scrap is transferred by a screw and secondarily separate remaining oil by vacuum suction of the generated oil vapor.

The first extraction means may include a first screw received in a first screw housing and configured to pressurize the input scrap while transferring the scrap in one direction, a first driving part configured to provide torque to the first screw, a warm-oil jacket provided in first screw housing and configured to contain a high-temperature fluid therein to apply heat to an inside of the first screw housing, and a first nozzle provided at an end of the first screw housing and configured to allow the scrap from which the oil is separated to be discharged therethrough, wherein the first screw housing may include at least one oil discharge hole formed at a position adjacent to the first nozzle and configured to allow the oil to be discharged therethrough in a direction different from a discharging direction of the scrap.

The first screw may be configured such that a diameter thereof gradually increases from a scrap inlet toward the first nozzle.

The second extraction means may include a hopper into which the scrap discharged from the first nozzle is input, a second screw configured to transfer the scrap input through the hopper in one direction, a second driving part configured to provide torque to the second screw, a heating chamber in which the second screw is received and configured to heat a transfer path of the scrap transferred by the screw, an oil vapor discharge part provided at one side of the heating chamber and configured to define a discharge path of the oil vapor generated as the scrap being transferred is heated, and a vacuum pump connected to the oil vapor discharge part and configured to vacuum suction the oil vapor.

According to another aspect of the present disclosure, there is provided a method of producing a recyclate, the method including: a shredding step of cutting a waste separator, or scrap generated during manufacturing of a separator; a pulverizing step of pulverizing the waste separator or scrap cut through the shredding step into scrap having a size within a set range; a first extraction step of inputting the scrap obtained through the pulverizing step into a first extraction means and then pressurizing and extruding the scrap to primarily remove oil contained in the scrap; a second extraction step of inputting the scrap from which the oil is primarily removed through the first extraction step into a second extraction means and heating the scrap while transferring the scrap, converting remaining oil remaining in the scrap into oil vapor, and then discharging the scrap from which the oil is secondarily removed while vacuum-suctioning the generated oil vapor; a cold cutting step of cutting the scrap from which the oil is removed through the second extraction step into the form of a pellet with a predetermined size; a transfer and drying step of transferring and drying the pellet cut through the cold cutting step; and a storage step of transferring to and storing in a storage device the pellet dried through the transfer and drying step.

The first extraction step and the second extraction step may be performed by providing a plurality of first extraction means and a plurality of second extraction means according to processing capacity.

A waste separator scrap oil extraction device according to the present disclosure is configured to include a first extraction means using a pressurization extraction method and a second extraction means using a vacuum extraction method, thereby enabling multi-extraction of oil.

In addition, in the case of the first extraction means, the diameter of a screw gradually increases from a scrap inlet toward a nozzle. Therefore, as input scrap is directed toward the nozzle, a stronger pressure is applied to the scrap, and heat that is increased in proportion to the pressure can increase oil separation force.

In addition, a warm-oil jacket in which a high-temperature fluid circulates is provided inside a screw housing provided on the outside of the screw, so that oil contained in the scrap can be more efficiently discharged by heat of screw compression and heat of the warm-oil jacket.

In addition, the waste separator scrap oil extraction device according to the present disclosure transfers the scrap processed by the first extraction means to the second extraction means, and the secondary extraction means simultaneously performs transfer and heating using a high-frequency heater and a screw, thereby generating oil vapor. In addition, from the oil vapor thus generated, the remaining oil not removed during primary extraction is removed during secondary extraction through vacuum suction.

That is, the waste separator scrap oil extraction device according to the present disclosure has the advantage of more effectively extracting oil from waste separator scrap through multi-extraction without the use of an extraction solvent and an impregnation process for oil extraction.

In addition, in a method of producing a recyclate according to the present disclosure, oil contained in a waste separator is extracted through extrusion and vacuum extraction, thereby enabling real-time extraction of the oil contained in input waste separator scrap. Therefore, the present disclosure has the advantage of realizing more faster and more efficient recycling of the waste separator scrap.

DETAILED DESCRIPTION OF THE INVENTION

Hereinafter, some embodiments of the present disclosure will be described in detail with reference to exemplary drawings. As for reference numerals associated with parts in the drawings, the same reference numerals will refer to the same or like parts throughout the drawings. Further, in the following description, it is to be noted that, when the functions of conventional elements and the detailed description of elements related with the present disclosure may make the gist of the present disclosure unclear, a detailed description of those elements will be simplified or omitted. It will be understood that when an element is referred to as being "provided" at or "connected" to a side of another element or as being "formed" together with another element, it can be directly provided at or connected to the side of the other element or can be formed together with the other element, or intervening elements may be "provided" or "connected" therebetween or may be "formed" together with the other element.

A waste separator scrap oil extraction device according to the present disclosure may be applied to a facility configuration for recycling of a waste separator, and is configured to separate oil from waste separators or scrap generated during manufacturing of separators, without the use of an extraction solvent.

Figure 2:
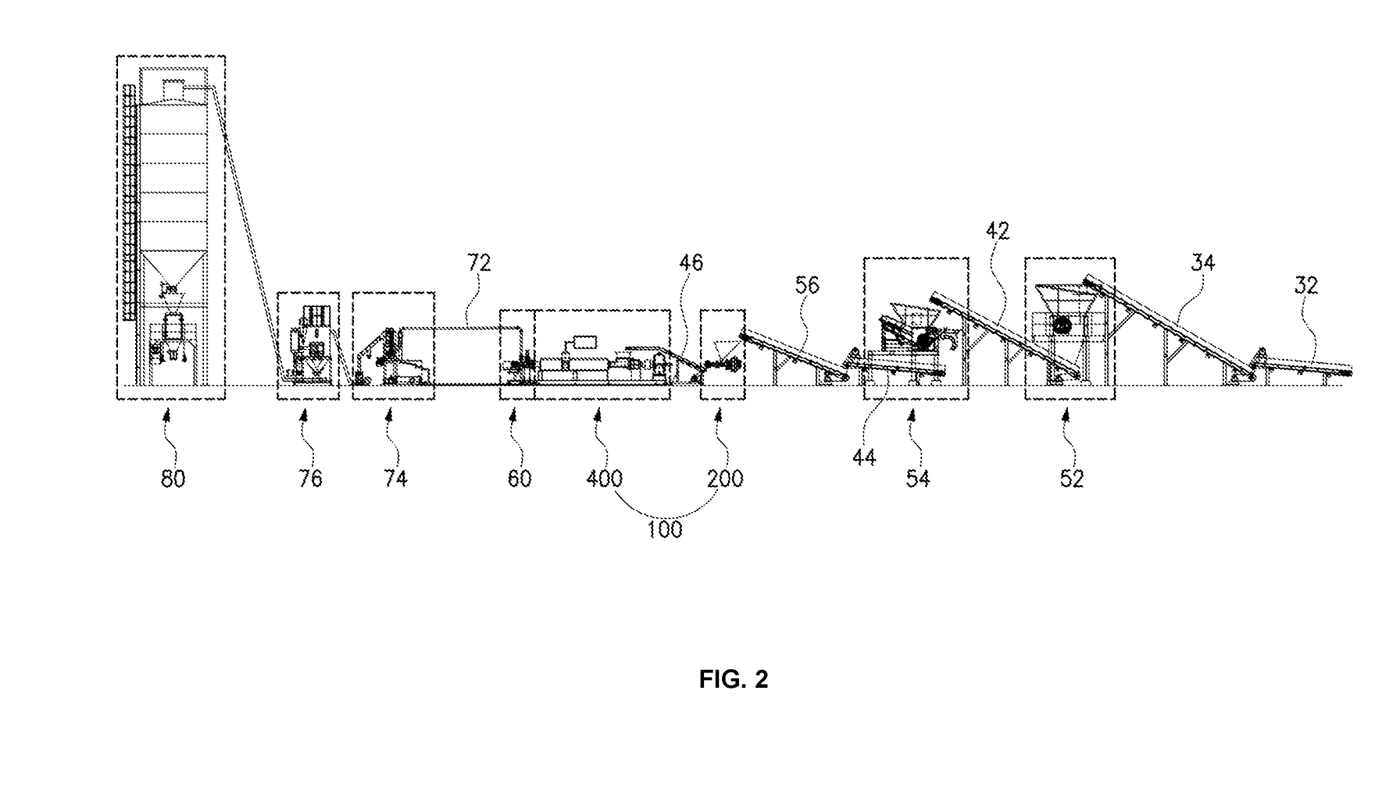
FIG. 2 is a view illustrating a facility configuration for a high-density polyethylene (HDPE) scrap recycling process to which the present disclosure is applied.

First, FIG. 2 is a view illustrating a facility configuration for a high-density polyethylene (HDPE) scrap recycling process to which the present disclosure is applied.

Referring to the drawings, a high-density polyethylene (hereinafter referred to as "HDPE") separation and recycling facility according to the present disclosure includes a shredding device 52 cutting a collected waste separator, and a pulverizing device 54 pulverizing shredded scrap to small and uniform sizes within a set range.

The shredding device 52 is a device for cutting the collected separator received through a plurality of conveyors, and the conveyors may be configured in multiple stages according to the installation height of the shredding device 52.

In this embodiment, the waste separator collected through a first input conveyor 32 having a relatively low inclination and a second input conveyor 34 having a higher inclination than the first input conveyor 32 is fed to the shredding device 52.

The shredding device 52 cuts the fed waste separator, and the cut waste separator is transferred to the pulverizing device 54 through a first transfer conveyor 42.

The pulverizing device 54 pulverizes final particles to a size within a set range so that oil extraction of the waste separator scrap oil extraction device according to the present disclosure can be made more effectively.

In this embodiment, the set range is less than 3 cm, and for efficient formation of such a particle size, at least the pulverizing device 54 may include a hydraulic motor.

That is, in the recycling facility to which the present disclosure is applied, the shredding device 52 and the pulverizing device 54 may have a high-torque structure through a hydraulic motor so as to increase oil extraction efficiency of the present disclosure. With this structure, extrusion efficiency can be improved by making the pulverized particles denser.

Meanwhile, the scrap pulverized to a limited particle size by the pulverizing device 54 is discharged to a first discharge conveyor 56, and the first discharge conveyor 56 transfers the scrap to a waste separator scrap oil extraction device 100 according to the present disclosure.

The waste separator scrap oil extraction device 100 is configured to extract oil without the use of an extraction agent for elution of oil contained in the waste separator as described above, and includes a first extraction means 200 using a pressurization method and a second extraction means 400 using a vacuum method.

The first extraction means 200 and the second extraction means 400 may be connected to each other through a third transfer conveyor 46 so that the scrap from which oil is primarily extracted may be transferred to the second extraction means 400.

Meanwhile, the first extraction means 200 and the second extraction means 400 will be described in more detail with reference to the accompanying drawings below, and the other components of the recycling facility illustrated in FIG. 2 will be described first.

The recycled scrap from which the oil is separated by the waste separator scrap oil extraction device 100 is cut into a recyclate of a pellet form by a cold cutting device 60.

That is, the cold cutting device 60 cuts the recycled scrap at a relatively high temperature into the pellet-form recyclate of a predetermined length, and the cut recyclate is cooled and washed using a fluid.

Then, the recyclate thus obtained is transferred to a drying and transfer device.

The drying and transfer device may include a transfer pipe 72, a vibrator 74, and a drying device 76.

That is, when the recyclate is transferred from the cold cutting device 60 to the vibrator 74 along the transfer pipe 72, the vibrator 74 primarily removes moisture contained in the recyclate using vibration. The recyclate from which moisture is primarily removed is transferred to the drying device 76 generating hot air or the like and dried to secondarily remove moisture contained therein. In addition, the recyclate after drying may be transferred to and stored in a storage device 80 such as a silo and may be re-fed as a raw material for use in manufacturing a secondary battery separator when needed.

Hereinafter, the waste separator scrap oil extraction device 100 applied to the recycling facility as above will be described.

Figure 3:
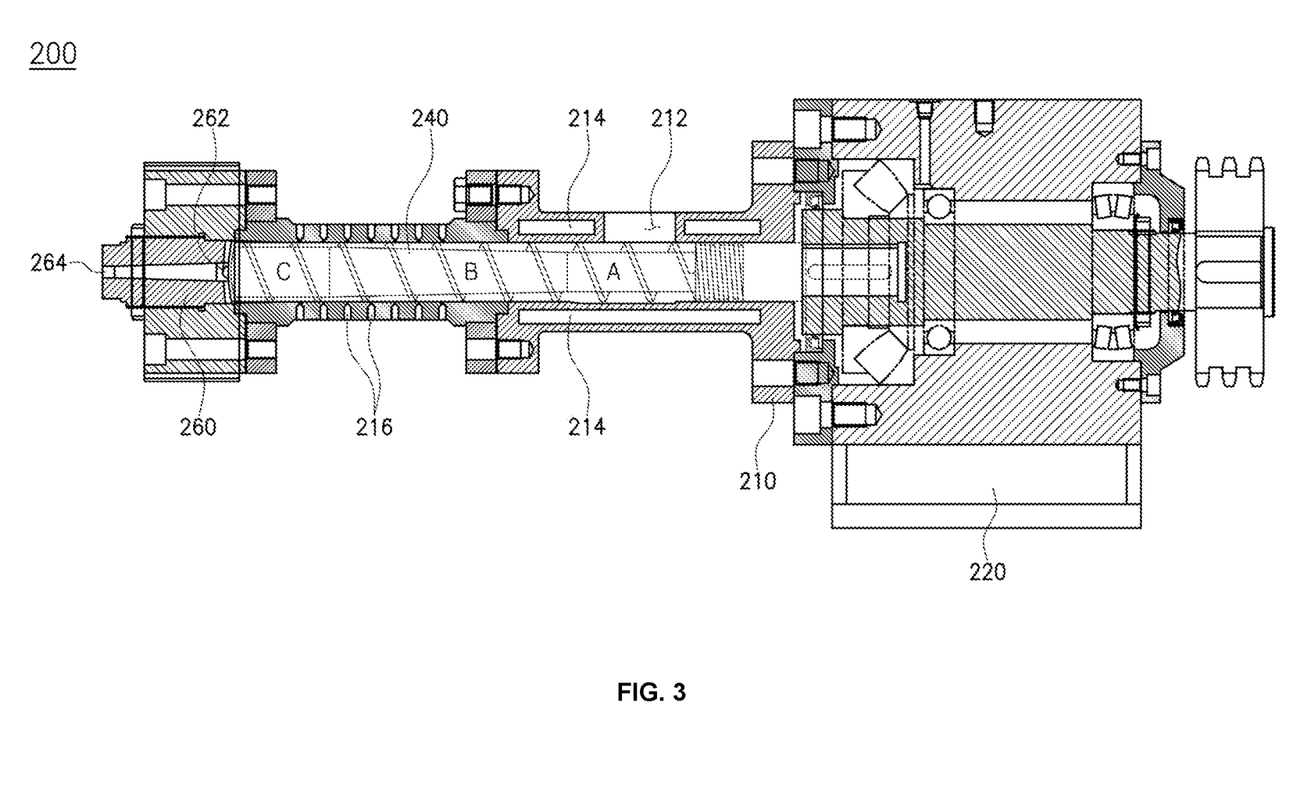
FIG. 3 is a view illustrating an embodiment of a first extraction means, which is a main component of the present disclosure.

First, FIG. 3 is a view illustrating an embodiment of a first extraction means, which is a main component of the present disclosure.

The first extraction means 200 is configured to, when the scrap pulverized to a particle size within a set range by the pulverize 54 is input thereinto, primarily separate and extract oil contained in the scrap by a pressurization and compression method.

In detail, the first extraction means 200 a first driving part 220 provided at side of a hollow-shaped first screw housing 210 and providing torque, and a first nozzle 260 provided at a second side of the first screw housing 210 and allowing the scrap from which the oil is primarily separated to be extruded therethrough.

The first driving part 220 may be configured as a hydraulic motor to produce a higher torque pressure. The first driving part 220 has a rotary shaft is coupled to a first screw 240 provided in the first screw housing 210 so as to rotate in conjunction with the first screw 240.

The first screw housing 210 has a scrap inlet 212 formed in a side thereof to allow the pulverized scrap to be input into an inner space of the housing, and a warm-oil jacket 214 storing a high-temperature fluid is provided at least around the scrap inlet 212.

The warm-oil jacket 214 is configured to apply heat to the scrap input into the inner space of the first screw housing 210 to facilitate oil extrusion, and is operated at a temperature variable from 50° C. to 200° C., but preferably operated in a temperature range of 100° C. to 120° C. in order to prevent solidification of the oil during pressurization without melting the scrap.

That is, in the case of HDPE to be recycled by the present disclosure, the melting point thereof ranges from 120° C. to 140° C. When the melting point is equal to or less than 100°

C., the oil is solidified, with the result that oil separation is not performed efficiently during extrusion. On the other hand, when the melting point exceeds 120° C., the oil is melted. Therefore, setting the operating temperature range of the warm-oil jacket 214 as described above allows the oil to be efficiently separated through extrusion.

Meanwhile, at least one oil discharge hole 216 is formed in the first screw housing 210 at a position adjacent to the first nozzle 260.

The oil discharge hole 216 is configured to, when the oil contained in the scrap flows down after being melted by heat of the warm-oil jacket 212 and by heat generated as the pulverized scrap is compressed by pressurizing force acting on the first nozzle 260, discharge the flowing oil to outside, and is located in a direction different from a discharge direction of the scrap.

That is, the oil discharge hole 216 is preferably formed in a direction crossing a pressurizing direction of the first screw housing 210 so as to allow the oil extracted by pressurization to be discharged by its own weight, while preventing the oil from being discharged through a first discharge end 264 of the nozzle together with the scrap. In consideration of the shape of the first screw 240 which will be described later, a plurality of oil discharge holes 216 may be formed at an equal interval.

The first screw 240 has a rotating body and a spiral blade formed on an outer surface of the rotating body, and is configured to pressurize and transfers the scrap input into the housing in one direction according to a rotational direction.

In addition, as illustrated in FIG. 3, the first screw 240 is configured such that the diameter thereof gradually increases from the diameter "A" at a position adjacent to the scrap inlet 212 toward the diameters "B and C" at positions adjacent to the first inlet end 262 of the first nozzle 260.

That is, the diameter of the first screw 240 is such that A<B<C, so that the separation distance between an inner surface of the first screw housing 210 and the rotating body of the first screw 240 gradually decreases from the diameter A position to the diameter C position.

Therefore, since the rotating body increases in diameter as the distance from the first inlet end 262 decreases, compressive force applied to the scrap and internal temperature increase in proportion, thereby enabling more effective separation of oil.

In addition, the rotation speed of the first driving part 220 may be varied according to an input amount of pulverized scrap to respond in real time. Therefore, it is possible to calculate optimal conditions for the input amount and the number of rotations on the basis of repeated extraction data, thereby improving production efficiency.

Figure 4:
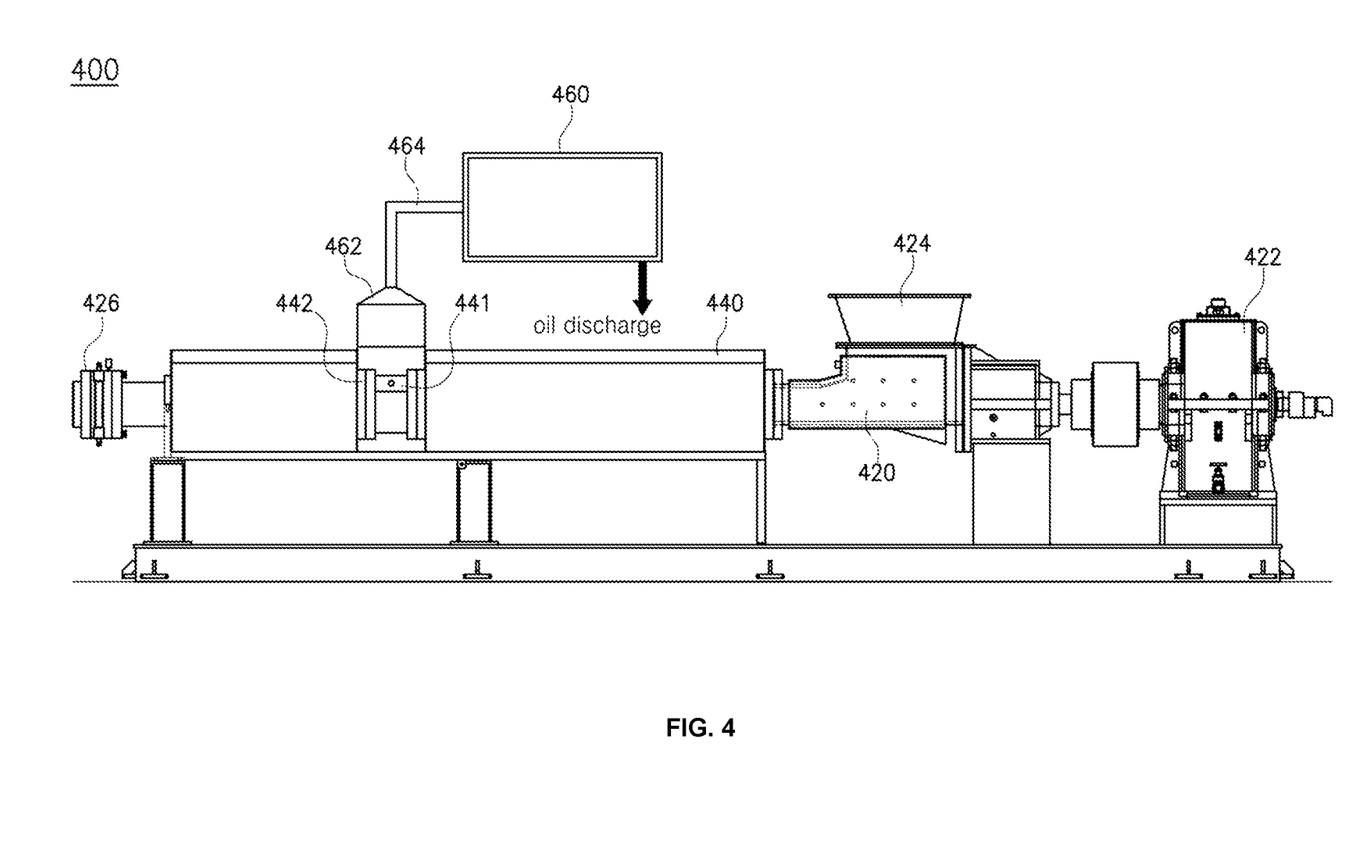
FIG. 4 is a view illustrating an embodiment of a second extraction means, which is a main component of the present disclosure.

Meanwhile, the scrap resulting from primarily and separating the oil from the pulverized scrap is transferred through the third transfer conveyor 46 to the second extraction means 400 to secondarily separate and extract remaining oil therefrom.

In detail, FIG. 4 is a view illustrating an embodiment of a first extraction means, which is a main component of the present disclosure.

The second extraction means 400 is configured to extract the remaining oil from the scrap from which the oil is primarily extracted, by a vacuum method.

To this end, the second extraction means 400 includes a second screw 420 transferring the input scrap; a second driving part 422 coaxially coupled to a rotary shaft of the second screw 420 to provide torque; a heating chamber 440 generating oil vapor by applying heat while defining a movement path of the second screw 420, and a vacuum pump 460 discharging the oil vapor generated while passing through the heating chamber 440 to outside using vacuum pressure.

In detail, the second screw 420 transfers the scrap from which the oil is primarily separated fed from the first extraction means 200 to a second discharge end 426 through the heating chamber 440, while performing pressurization to allow the scrap from which the oil is secondarily separated to be extracted through the second discharge end 426.

To this end, the second driving part 422 providing torque to the second screw 420 is also configured as a hydraulic motor to generate a high torque to ensure stable pressurization transfer.

The heating chamber 440 provides a space in which oil vapor is generated as the scrap transferred by the second screw 420 is heated along a predetermined transfer path. To this end, a heater is provided in the heating chamber 440.

In this embodiment, the heater is a high-frequency induction heater that allows a uniform heat distribution to be made inside the heating chamber 440. An oil vapor discharge part 442 is provided at a side of the heating chamber 440 to allow the oil vapor generated as the scrap is heated over a predetermined section to be discharged therethrough.

The oil vapor discharge part 442 has a narrower cross-sectional area than the heating chamber 440, and has a discharge hole 441 formed at a side thereof to allow the oil vapor to discharge therethrough.

In addition, a suction chamber 462 applying negative pressure generated by the vacuum pump 460 is connected to the discharge hole 441 through a suction pipe 464.

Therefore, the oil vapor generated in the heating chamber 440 may be discharged through the discharge hoe 441 and extracted to the vacuum pump 460 through the suction chamber 462 and the suction pipe 464.

The scrap from which the oil is secondarily extracted by such a vacuum suction method is discharged through the second discharge end 426 of the second nozzle. The scrap from which the oil is extracted two times is processed into the form of a pellet by the cold cutting device 60 and the drying and transfer device and stored as a recyclate in the storage device 80.

That is, the waste separator scrap oil extraction device 100 according to the present disclosure primarily extracts oil contained in the scrap through heating and pressurization, and converts the remaining oil remaining in the scrap into oil vapor through high-frequency induction heating to remove the oil vapor through vacuum suction.

Therefore, when the waste separator scrap oil extraction device 100 having the above structure is applied to a recyclate production process, it is possible to mass-produce higher-purity high-density polyethylene (HDPE).

Figure 5:
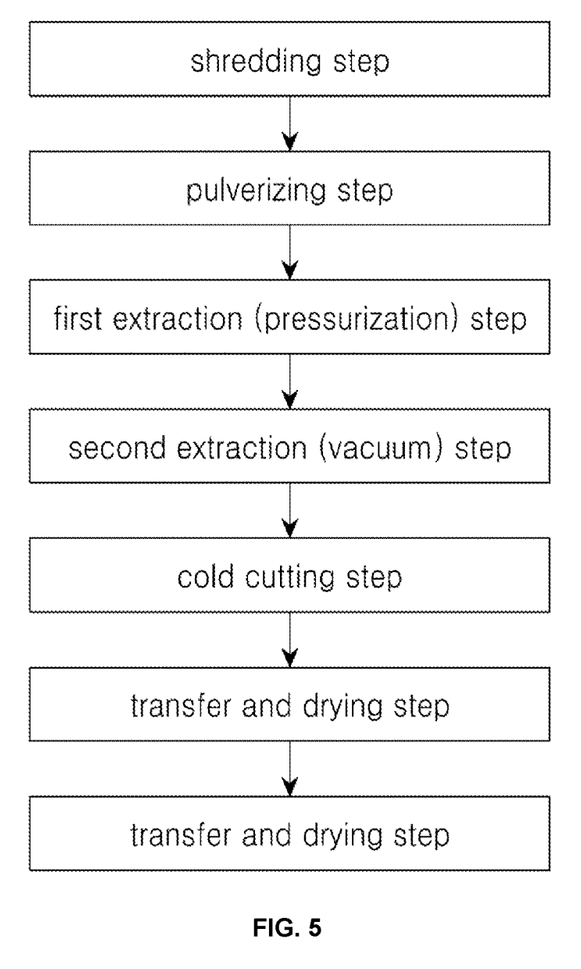
FIG. 5 is a flowchart illustrating the high-density polyethylene (HDPE) scrap recycling process according to the present disclosure.
Figure 6:
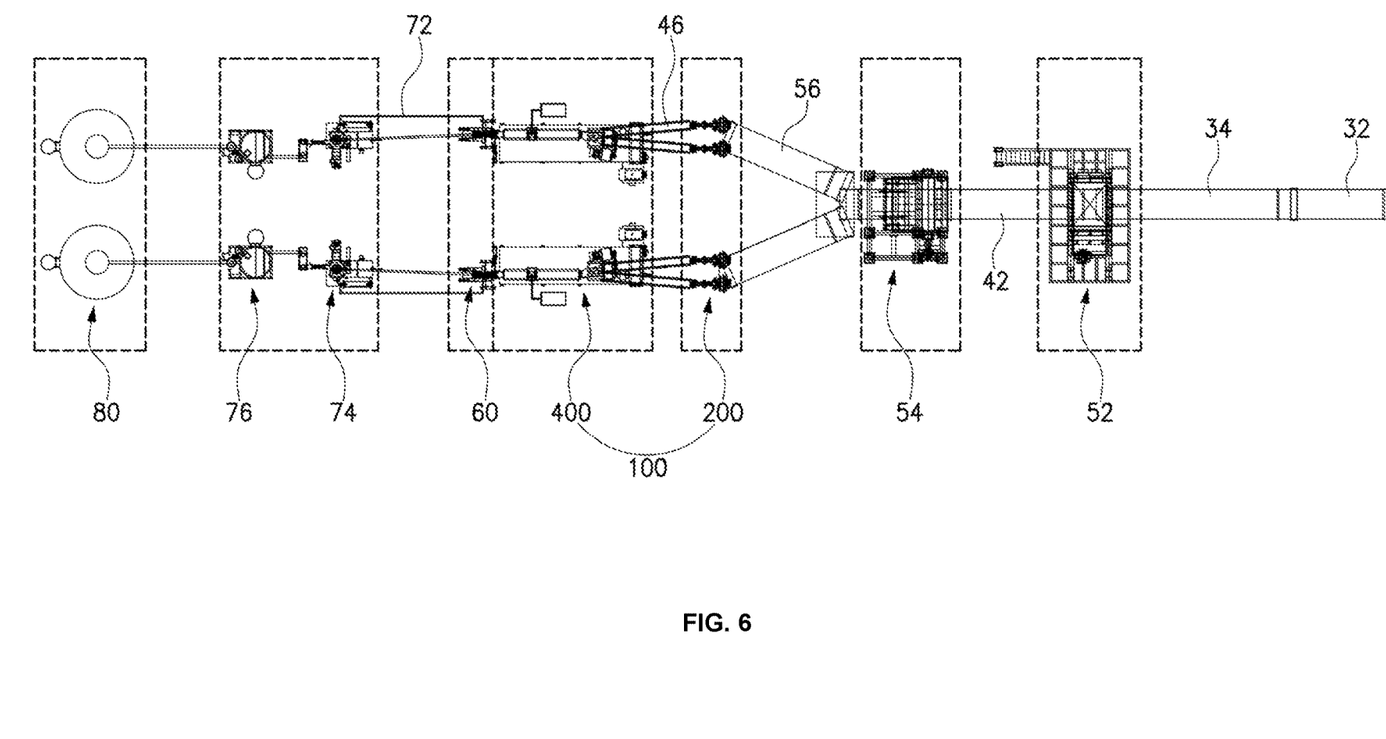
FIG. 6 is a view illustrating another embodiment of a facility configuration for the high-density polyethylene (HDPE) scrap recycling process to which the present disclosure is applied.

FIG. 5 is a flowchart illustrating the high-density polyethylene (HDPE) scrap recycling process according to the present disclosure, and FIG. 6 is a view illustrating another embodiment of a facility configuration for the high-density polyethylene (HDPE) scrap recycling process to which the present disclosure is applied.

Referring to these drawings, a method of producing a recyclate according to the present disclosure first performs a shredding step of cutting a waste separator, or scrap generated during production of a separator, and a pulverizing step of pulverizing the waste separator of the scrap cut through the shredding step into scrap having a size within a set range.

The shredding step and the pulverizing step are performed by a shredding device 52 and a pulverizing device 54 each composed of a hydraulic motor in order to secure torque stability and thereby obtain a finer particle size.

Then, a first extraction step is performed in which the scrap obtained through the pulverizing step is input into a first extraction means 200 and is then pressurized and extruded to primarily remove oil contained in the scrap.

In addition, in the first extraction step, heating by a warm-oil jacket 214 and pressurization through a first screw 240 are simultaneously performed. The operation of the warm-oil jacket 214 is controlled in a temperature range in which the scrap is not dissolved and while the oil contained in the scrap is not solidified, thereby enabling stable extraction of oil.

Then, a second extraction step is performed in which the scrap from which the oil is primarily removed through the first extraction step is input into a second extraction means 400, and oil vapor is generated to be extracted by a vacuum suction method.

In the second extraction step, the remaining oil remaining in the scrap without being removed in the first extraction step is converted into oil vapor while passing through a heating chamber 440, the oil vapor is extracted by a vacuum pump 600, and the scrap from which the oil is secondarily removed is discharged.

Meanwhile, in the first extraction step and the second extraction step, a plurality of first extraction means 200 and a plurality of second extraction means 400 may be provided according to processing capacity to perform parallel processing.

That is, as illustrated in FIG. 6, in the method of producing the recyclate according to the present disclosure, the scrap pulverized by the pulverizing device 54 is divided and fed into the plurality of first extraction means 200. The scrap transferred to the plurality of first extraction means 200 is subjected to primarily extracting oil therefrom and is then transferred to the second extraction means 400 and subjected to secondarily extracting the oil therefrom.

At this time, the first extraction means 200 and the second extraction means 400 may be provided in numbers corresponding to each other, but is not limited thereto. For example, when the processing capacity of the second extraction means 400 is larger than that of the first extraction means 200, the installation number of the second extraction means 400 may be varied in proportion to the processing capacity.

Meanwhile, after the oil is removed through the second extraction step, a cold cutting step is performed in which the discharged scrap is cut into the form of a pellet with a predetermined size.

That is, in the cold cutting step, the scrap is hardened and washed through a cooling fluid while being cut into the form of a pellet, thereby obtaining a recyclate of a pellet form.

The pellet-form recyclate thus obtained is again subjected to a transfer and drying step to remove moisture contained therein, and the recyclate from which the moisture is removed is subjected to a storage step to be transferred to and stored in a storage device 80 to complete the production of the recyclate.

The waste separator scrap oil extraction device according to the present disclosure enables real-time extraction of oil contained in waste separator scrap by a multi-extraction method through pressurization and vacuum extraction, without requiring input of an extraction solvent and an impregnation process, thereby realizing a faster and more efficient recycling process.

Meanwhile, as the supply of electric vehicles increases worldwide, waste batteries generated by electric vehicles are expected to increase significantly in the future, and collection of these waste batteries is mandatory in countries around the world, such as the United States, Japan, and Europe. Therefore, the industrial applicability of the present disclosure, which collects and recycles a separator from a waste battery, is expected to significantly increase.

In addition, since the present disclosure can extract high-density polyethylene (HDPE) by recycling the separator collected from the waste battery, when this HDPE is used again as a material for a separator of a secondary battery, it is possible to lower the unit cost of a separator in manufacturing of a lithium ion secondary battery, thereby increasing the price competitiveness of the secondary battery.

In addition, the recycled high-density polyethylene (HDPE) can be used in the production of various products such as energy storage systems (ESS) as well as manufacturing of separators for secondary batteries.

In addition, the present disclosure can contribute to reducing problems such as environmental pollution and global warming caused by waste plastic. In terms of the Green New Deal policy and the global trend for environmental protection, the market and application range of the recycling of the waste separator is expected to be further extended, and accordingly, the industrial applicability of the present disclosure is expected to further increase.

What is claimed is:

1. A waste separator scrap oil extraction device comprising:
   a first extraction means into which pulverized scrap is input, and configured to primarily separate oil from scrap while extruding the input scrap by a pressurization method with a screw; and
   a secondary extraction means into which the scrap from which the oil is separated by the first extraction means is input, and configured to generate oil vapor by applying heat to the scrap when the scrap is transferred by a screw and secondarily separate remaining oil by vacuum suction of the generated oil vapor.

2. The waste separator scrap oil extraction device of claim 1, wherein the first extraction means comprises
   a first screw received in a first screw housing and configured to pressurize the input scrap while transferring the scrap in one direction,
   a first driving part configured to provide torque to the first screw,
   a warm-oil jacket provided in first screw housing and configured to contain a high-temperature fluid therein to apply heat to an inside of the first screw housing, and
   a first nozzle provided at an end of the first screw housing and configured to allow the scrap from which the oil is separated to be discharged therethrough,
   wherein the first screw housing comprises at least one oil discharge hole formed at a position adjacent to the first nozzle and configured to allow the oil to be discharged therethrough in a direction different from a discharging direction of the scrap.

3. The waste separator scrap oil extraction device of claim 2, wherein the first screw is configured such that a diameter thereof gradually increases from a scrap inlet toward the first nozzle.

4. The waste separator scrap oil extraction device of claim 2, wherein the second extraction means comprises
   a hopper into which the scrap discharged from the first nozzle is input,
   a second screw configured to transfer the scrap input through the hopper in one direction,
   a second driving part configured to provide torque to the second screw, a heating chamber in which the second screw is received and configured to heat a transfer path of the scrap transferred by the screw, an oil vapor discharge part provided at one side of the heating chamber and configured to define a discharge path of the oil vapor generated as the scrap being transferred is heated, and a vacuum pump connected to the oil vapor discharge part and configured to vacuum suction the oil vapor.

5. A method of producing a recyclate, the method comprising:

a shredding step of cutting a waste separator, or scrap generated during manufacturing of a separator;

a pulverizing step of pulverizing the waste separator or scrap cut through the shredding step into scrap having a size within a set range;

a first extraction step of inputting the scrap obtained through the pulverizing step into a first extraction means and then pressurizing and extruding the scrap to primarily remove oil contained in the scrap;

a second extraction step of inputting the scrap from which the oil is primarily removed through the first extraction step into a second extraction means and heating the scrap while transferring the scrap, converting remaining oil remaining in the scrap into oil vapor, and then discharging the scrap from which the oil is secondarily removed while vacuum-suctioning the generated oil vapor;

a cold cutting step of cutting the scrap from which the oil is removed through the second extraction step into the form of a pellet with a predetermined size;

a transfer and drying step of transferring and drying the pellet cut through the cold cutting step; and a storage step of transferring to and storing in a storage device the pellet dried through the transfer and drying step.

6. The method of claim 5, wherein the first extraction step and the second extraction step are performed by providing a plurality of first extraction means and a plurality of second extraction means according to processing capacity.

* * * * *